(12) United States Patent
Chen et al.

(10) Patent No.: US 8,150,063 B2
(45) Date of Patent: Apr. 3, 2012

(54) STABILIZING DIRECTIONAL AUDIO INPUT FROM A MOVING MICROPHONE ARRAY

(75) Inventors: Shaohai Chen, Cupertino, CA (US); Phillip George Tamchina, Mountain View, CA (US); Jae Han Lee, San Jose, CA (US)

(73) Assignee: Apple Inc., Cupertino, CA (US)

( * ) Notice: Subject to any disclaimer, the term of this patent is extended or adjusted under 35 U.S.C. 154(b) by 634 days.

(21) Appl. No.: 12/323,284

(22) Filed: Nov. 25, 2008

(65) Prior Publication Data

US 2010/0128892 A1 May 27, 2010

(51) Int. Cl.
*H04R 3/00* (2006.01)
(52) U.S. Cl. .............................. 381/92; 381/91; 381/122
(58) Field of Classification Search .................... 381/91, 381/92, 122
See application file for complete search history.

(56) References Cited

U.S. PATENT DOCUMENTS

| | | | |
|---|---|---|---|
| 7,162,043 B2 * | 1/2007 | Sugiyama et al. | 381/92 |
| 7,684,571 B2 | 3/2010 | Grosvenor et al. | |
| 2008/0267422 A1 * | 10/2008 | Cox | 381/92 |
| 2008/0288219 A1 * | 11/2008 | Tashev et al. | 702/190 |

OTHER PUBLICATIONS

Hari Drishna Maganti, et al., Speech Enhancement and Recognition in Meetings With an Audio-Visual Sensor Array, IEEE Transactions on Audio, Speech, and Language Processing, vol. 15, No. 8, Nov. 2007, pp. 2257-2269.
Kaustubh R. Kale, Low Complexity, Narrow Baseline Beamformer for Hand-Held Devices, a thesis presented to the graduate school of the University of Florida in partial fulfillment of the requirements for the degree of Master of Science University of Florida, 2003.

\* cited by examiner

*Primary Examiner* — Wai Sing Louie
(74) *Attorney, Agent, or Firm* — Blakely, Sokoloff, Taylor & Zafman LLP

(57) ABSTRACT

A device includes a microphone array fixed to the device. A signal processor produces an audio output using audio beamforming with input from the microphone array. The signal processor aims the beamforming in a selected direction. An orientation sensor—such as a compass, an accelerometer, or an inertial sensor—is coupled to the signal processor. The orientation sensor detects a change in the orientation of the microphone array and provides an orientation signal to the signal processor for adjusting the aim of the beamforming to maintain the selected direction. The device may include a camera that captures an image. An image processor may identify an audio source in the image and provide a signal adjusting the selected direction to follow the audio source. The image processor may receive the orientation signal and adjust the image for changes in the orientation of the camera before tracking movement of the audio source.

9 Claims, 2 Drawing Sheets

STABILIZING DIRECTIONAL AUDIO INPUT FROM A MOVING MICROPHONE ARRAY

BACKGROUND

1. Field

Embodiments of the invention relate to the field of audio beamforming; and more specifically, to the aiming of audio beamforming.

2. Background

Under typical imperfect conditions, a single microphone that is embedded in a mobile device does a poor job of capturing sound because of background sounds that are captured along with the sound of interest. An array of microphones can do a better job of isolating a sound source and rejecting ambient noise and reverberation.

Beamforming is a way of combining sounds from two or more microphones that allows preferential capture of sounds coming from certain directions. In a delay-and-sum beamformer sounds from each microphone are delayed relative to sounds from the other microphones, and the delayed signals are added. The amount of delay determines the beam angle—the angle in which the array preferentially "listens." When a sound arrives from this angle, the sound signals from the multiple phones are added constructively. The resulting sum is stronger, and the sound is received relatively well. When a sound arrives from another angle, the delayed signals from the various microphones add destructively—with positive and negative parts of the sound waves canceling out to some degree—and the sum is not as loud as an equivalent sound arriving from the beam angle.

For example, if the sound comes into the microphone on the right before it enters the microphone on the left, then you know the sound source is to the right of the microphone array. During sound capturing, the microphone array processor can aim a capturing beam in the direction of the sound source. Beamforming allows a microphone array to simulate a highly directional microphone pointing toward the sound source. The directivity of the microphone array reduces the amount of captured ambient noises and reverberated sound as compared to a single microphone. This may provide a clearer representation of a speaker's voice.

A beamforming microphone array may made up of distributed omnidirectional microphones linked to a processor that combines the several inputs into an output with a coherent form. Arrays may be formed using numbers of closely spaced microphones. Given a fixed physical relationship in space between the different individual microphone transducer array elements, simultaneous digital signal processor (DSP) processing of the signals from each of the individual microphones in the array can create one or more "virtual" microphones. Different algorithms permit the creation of virtual microphones with extremely complex virtual polar patterns and even the possibility to steer the individual lobes of the virtual microphones patterns so as to home-in-on, or to reject, particular sources of sound. Beamforming techniques, however, rely on knowledge of the location of the sound source. Therefore it is necessary to aim the beamforming at the intended sound source to benefit from the use of a microphone array. It would be desirable to maintain the aim of the beamforming when the microphone array is part of a mobile device.

SUMMARY

A device includes a microphone array fixed to the device. A signal processor produces an audio output using audio beamforming with input from the microphone array. The signal processor aims the beamforming in a selected direction. An orientation sensor—such as a compass, an accelerometer, or an inertial sensor—is coupled to the signal processor. The orientation sensor detects a change in the orientation of the microphone array and provides an orientation signal to the signal processor for adjusting the aim of the beamforming to maintain the selected direction. The device may include a camera that captures an image. An image processor may identify an audio source in the image and provide a signal adjusting the selected direction to follow the audio source. The image processor may receive the orientation signal and adjust the image for changes in the orientation of the camera before tracking movement of the audio source.

Other features and advantages of the present invention will be apparent from the accompanying drawings and from the detailed description that follows below.

BRIEF DESCRIPTION OF THE DRAWINGS

The invention may best be understood by referring to the following description and accompanying drawings that are used to illustrate embodiments of the invention by way of example and not limitation. In the drawings, in which like reference numerals indicate similar elements.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

Figure 1A:
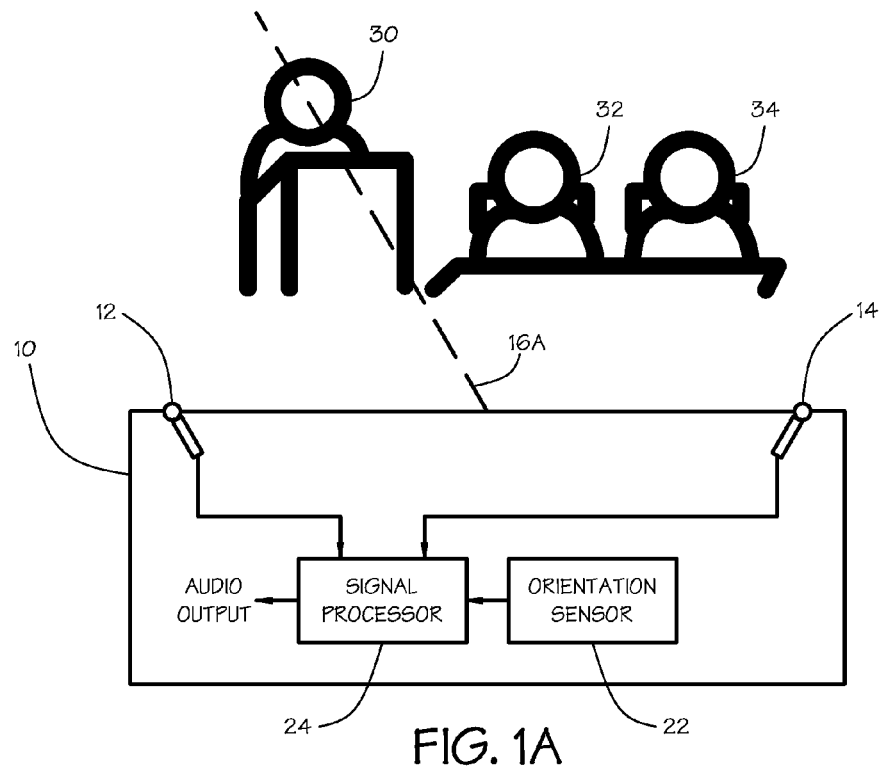
FIG. 1A is a block diagram of a mobile device to provide an audio output.

FIG. 1A is a block diagram of a mobile device 10 to provide an audio output. The device may be an audio recorder, a cellular telephone, or other device for capturing an audio source and providing an audio output. A microphone array 12, 14 is fixed to the device. The microphone array includes at least two individual microphones. A signal processor 24 is coupled to the microphone array to produce the audio output using audio beamforming with input from the microphone array. The signal processor aims the audio beamforming in a selected direction, as suggested by the dashed line directed toward a speaker 30. The audio beamforming provides a directional audio sensitivity so that the sound from the speaker 30 at whom the audio beamforming is aimed is emphasized. Other sound, such as a conversation between people 32, 34 adjacent the speaker, may be attenuated by the beamforming.

Figure 1B:
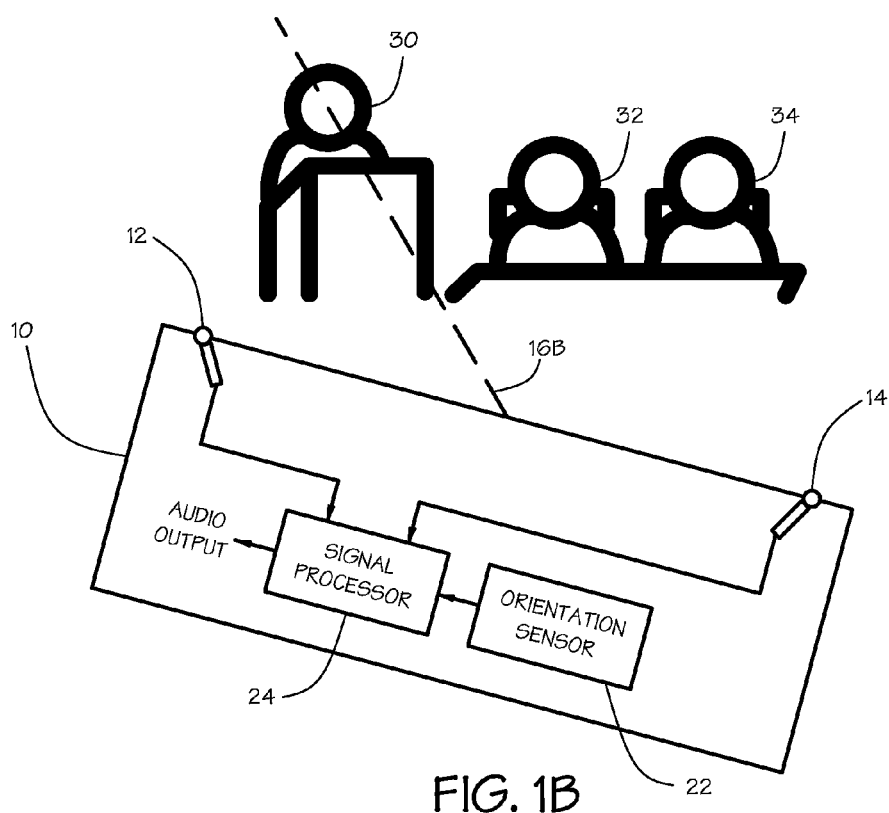
FIG. 1B shows the mobile device after having moved from the orientation shown in FIG. 1A.

FIG. 1B shows the mobile device 10 having moved relative to the speaker 30. The device 10 includes an orientation sensor 22 coupled to the signal processor 24. The orientation sensor 22 detects a change in the orientation of the device and hence the microphone array since the orientation sensor and the microphone array are both fixed to the device so that they all move in unison. The orientation sensor 22 provides an orientation signal to the signal processor 24 for adjusting the aim of the audio beamforming to maintain the selected direction of the beamforming despite the movement of the device 10.

It will be appreciated that the amount of adjustment made by signal processor 24 to maintain the selected direction of the beamforming is dependent on both the magnitude and the direction of movement of the device 10. For example, moving the device up and down perpendicular to the axis of a linear microphone array will not change the aiming of the audio beamforming. On the other hand, rotating the device around an axis that is perpendicular to the axis of a linear microphone array will have a large effect on the aiming of the audio beamforming. The signal processor will use both magnitude and direction information in the orientation signal to make an appropriate adjustment to the aiming of the audio beamforming.

Any of a variety of devices may be used, either singly or in combination, as an orientation sensor 22. For example, the orientation sensor 22 may be a compass that is mechanically fixed to the device 10 such that there is no relative movement between the compass mounting and the microphone array 12,14. For the purposes of the invention, a compass includes any device that provides an orientation signal based on the position of the device within the Earth's magnetic field.

The orientation sensor 22 may be an accelerometer that is mechanically fixed to the device 10 such that there is no relative movement between the accelerometer mounting and the microphone array 12,14. An accelerometer provides an orientation signal based on acceleration and gravity induced reaction forces. Thus the accelerometer provides an inertial reference platform that can determine changes in the position and orientation of the device 10 without using external references.

The orientation sensor 22 may be an inertial sensor that is mechanically supported by the device 10 such that there is no relative movement between the inertial sensor mounting and the microphone array 12,14. For the purposes of the invention, an inertial sensor includes any device that senses changes in the orientation of a support structure relative to a structure that resists changes in orientation. A gyroscope is an exemplary inertial sensor. Various devices which may be described as vibrating structure gyroscopes may be used as an inertial sensor.

The orientation sensor 22 may be a micro-electro-mechanical systems (MEMS) device.

Figure 2:
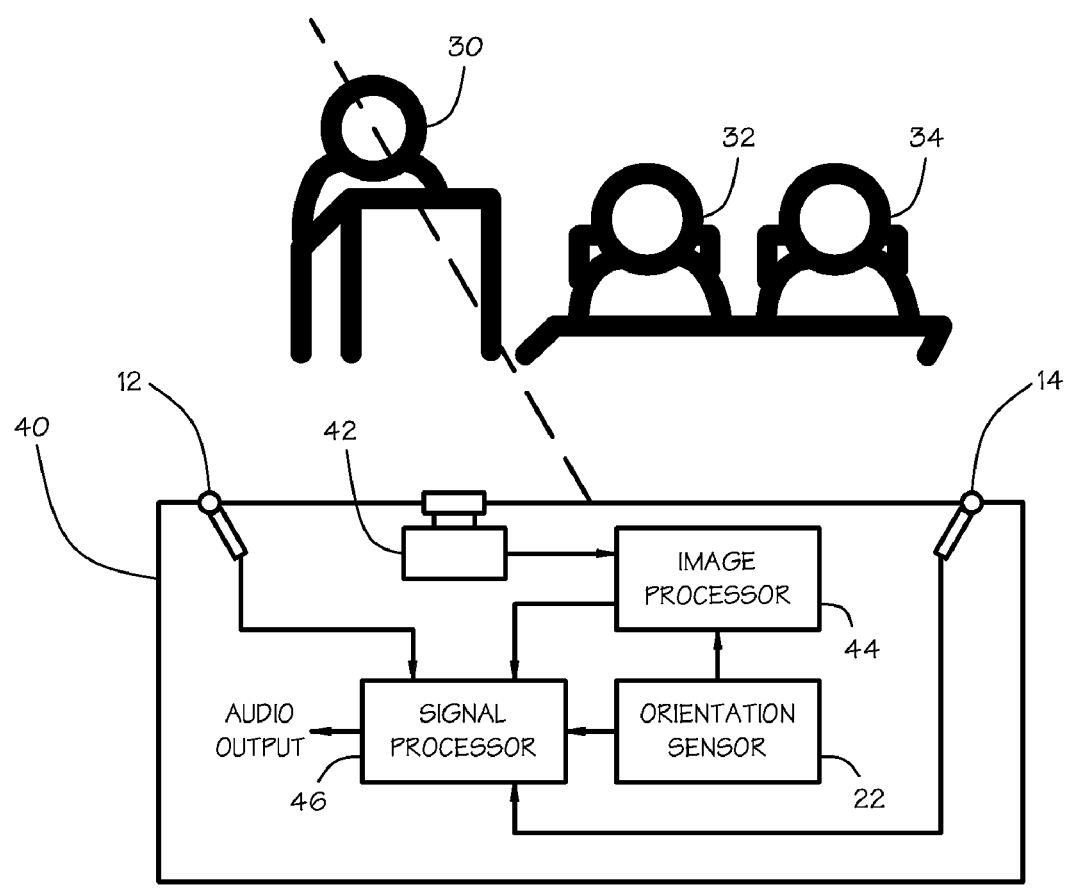
FIG. 2 is a block diagram of another mobile device to provide an audio output.

FIG. 2 is a block diagram of another mobile device 40 to provide an audio output. The device 40 includes the elements of the device 10 shown in FIG. 1A. The device 40 further includes a camera 42 fixed to the device. The camera 42 captures an image that includes the audio source 30 at which the audio beamforming is aimed. An image processor 44 is coupled to the camera 42, the signal processor 46, and the orientation sensor 22. The image processor 44 may identify the audio source in the image received from the camera, track movement of the audio source, and provide a motion signal to the signal processor 46 for adjusting the selected direction to follow the audio source. The image processor 44 may identify the audio source based on a user input to select the audio source at which to aim of the audio beamforming. In other embodiments, the image processor 44 may identify the audio source in various automatic or semi-automatic ways. The image processor 44 further receives the orientation signal from the orientation sensor 22 and adjusts the image for changes in the orientation of the device, and hence the camera, before tracking movement of the audio source 40. The speed and accuracy of the tracking of movement of the audio source may be improved by first adjusting the image to remove the effects of camera movements.

While certain exemplary embodiments have been described and shown in the accompanying drawings, it is to be understood that such embodiments are merely illustrative of and not restrictive on the broad invention, and that this invention is not limited to the specific constructions and arrangements shown and described, since various other modifications may occur to those of ordinary skill in the art. The description is thus to be regarded as illustrative instead of limiting.

What is claimed is:

1. A device to provide an audio output, the device comprising:
    a microphone array fixed to the device;
    a signal processor coupled to the microphone array to produce the audio output using audio beamforming with input from the microphone array, the signal processor aiming the audio beamforming in a selected direction; and
    an orientation sensor coupled to the signal processor, the orientation sensor detecting a change in the orientation of the microphone array and providing an orientation signal to the signal processor for adjusting the aim of the audio beamforming to maintain the selected direction.

2. The device of claim 1, wherein the orientation sensor is a compass that is mechanically fixed to the device such that there is no relative movement between the compass mounting and the microphone array.

3. The device of claim 1, wherein the orientation sensor is an accelerometer that is mechanically fixed to the device such that there is no relative movement between the accelerometer mounting and the microphone array.

4. The device of claim 1, wherein the orientation sensor is an inertial sensor that is mechanically supported by the device such that there is no relative movement between the inertial sensor mounting and the microphone array.

5. The device of claim 1, further comprising:
    a camera fixed to the device, the camera capturing an image; and
    an image processor coupled to the camera, the signal processor, and the orientation sensor, the image processor identifying an audio source in the image received from the camera, tracking movement of the audio source, and providing a motion signal to the signal processor for adjusting the selected direction to follow the audio source, the image processor receiving the orientation signal and adjusting the image for changes in the orientation of the camera before tracking movement of the audio source.

6. A device to provide an audio output, the device comprising:
    a microphone array fixed to the device;
    a signal processor coupled to the microphone array to produce the audio output using audio beamforming with input from the microphone array, the signal processor aiming the audio beamforming in a selected direction; and
    an accelerometer coupled to the signal processor and mechanically supported by the device such that there is no relative movement between the accelerometer mounting and the microphone array, the accelerometer detecting a change in the orientation of the microphone array and providing an orientation signal to the signal processor for adjusting the aim of the audio beamforming to maintain the selected direction.

7. The device of claim 1, further comprising:
    a camera fixed to the device, the camera capturing an image; and
    an image processor coupled to the camera, the signal processor, and the accelerometer, the image processor identifying an audio source in the image received from the camera, tracking movement of the audio source, and providing a motion signal to the signal processor for adjusting the selected direction to follow the audio source, the image processor receiving the orientation signal and adjusting the image for changes in the orientation of the camera before tracking movement of the audio source.

8. A device to provide an audio output, the device comprising:
a microphone array fixed to the device;
a signal processor coupled to the microphone array to produce the audio output using audio beamforming with input from the microphone array, the signal processor aiming the audio beamforming in a selected direction; and
an inertial sensor coupled to the signal processor and mechanically supported by the device such that there is no relative movement between the inertial sensor mounting and the microphone array, the inertial sensor detecting a change in the orientation of the microphone array and providing an orientation signal to the signal processor for adjusting the aim of the audio beamforming to maintain the selected direction.

9. The device of claim 1, further comprising:
a camera fixed to the device, the camera capturing an image; and
an image processor coupled to the camera, the signal processor, and the inertial sensor, the image processor identifying an audio source in the image received from the camera, tracking movement of the audio source, and providing a motion signal to the signal processor for adjusting the selected direction to follow the audio source, the image processor receiving the orientation signal and adjusting the image for changes in the orientation of the camera before tracking movement of the audio source.

* * * * *